July 7, 1959 K. RUCKSTUHL Re. 24,665

EXTRUSION PRESS

Original Filed Oct. 4, 1954 2 Sheets-Sheet 1

INVENTOR
KONRAD RUCKSTUHL

Ernest S. Carver
ATTORNEY.

EXTRUSION PRESS

Original Filed Oct. 4, 1954 2 Sheets-Sheet 2

INVENTOR
KONRAD RUCKSTUHL

Ernest E. Carver
ATTORNEY

United States Patent Office

Re. 24,665
Reissued July 7, 1959

24,665

EXTRUSION PRESS

Konrad Ruckstuhl, Basel, Switzerland

Original No. 2,810,181, dated October 22, 1957, Serial No. 460,179, October 4, 1954. Application for reissue March 31, 1958, Serial No. 725,459

10 Claims. (Cl. 18—12)

Matter enclosed in heavy brackets [ ] appears in the original patent but forms no part of this reissue specification; matter printed in italics indicates the additions made by reissue.

My present invention relates to an extrusion press for the production of molded articles of non-uniform pressing material such as wood waste and vegetable residues, in which said material moves from a hopper into an antechamber from which it is pushed by a ram into the die head, a device being provided for preliminary compressing the material prior to its introduction into the die head.

The term "wood waste" includes, for example, saw dust and shavings, and the term "vegetable residues" includes, for example, straw, sugar-cane bagasse, cotton hulls and husks, cotton stalks, rice hulls. Vegetable residues, of course, have to be crushed to some extent prior to their introduction into the press.

Known extrusion presses for producing pressed articles of different materials and without binding agents, only then permit trouble free operation when the material is of uniform character, i.e. when the structure of the material does not change materially and when there is not suddenly fed a greater percentage of fine corn, for in such case the press is overloaded owing to the greater frictional resistance arising in the die head.

Practice further has shown that with the aid of extrusion presses known so far, elastic material or material which requires comparatively much space could not be used economically.

The object of the present invention is to eliminate the above mentioned disadvantages by means of a special preliminary compressing device. Such device is formed by dogs which are disposed in front of the die head inlet and after each stroke of the ram grip the material discharged from the hopper in order to pre-compress said material to a loose blank of which the cross-section substantially corresponds to that of the ram, before the material is pushed into the die head by the ram.

One form of the invention is shown, by way of example, in the accompanying drawing, in which.

Figure 1:
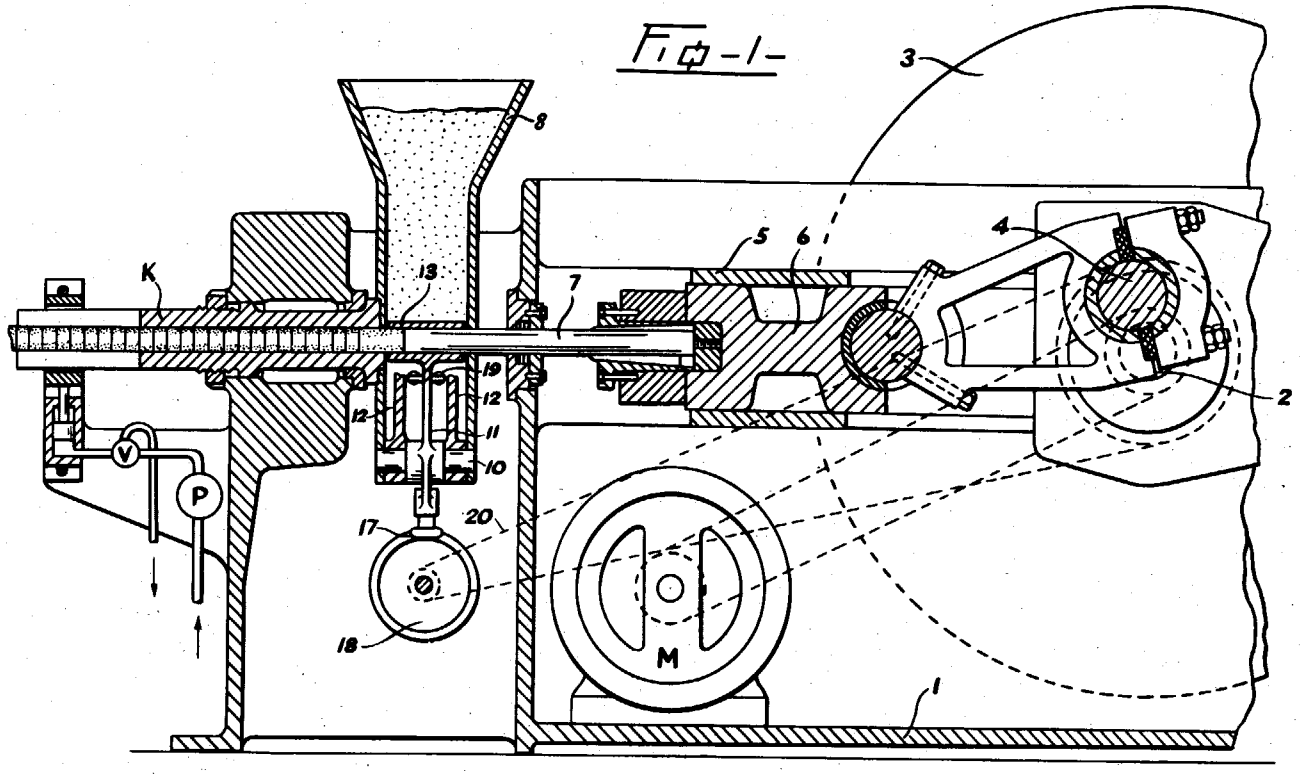
Fig. 1 shows the press in longitudinal section.

The press shown in Fig. 1 comprises a frame 1 including an electric motor M for driving the shaft 2 of a flywheel 3 which carries an eccentric 4. The latter carries a piston 6 which is reciprocable in a guide 5, and the piston carries a ram 7. The latter moves transversely through the mouth of a hopper 8, which mouth is of a square cross-section, and at the end of its strokes enters into the mouth of a die head K. The latter, in known manner, is formed of rod-like elements on a portion of its length. Said elements together form a duct in which the material is pressed.

Figure 2:
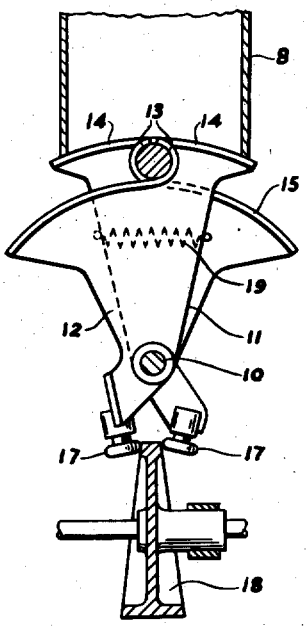
Figs. 2 and 3 depict the mode of operation of the precompressing device.
Figure 3:
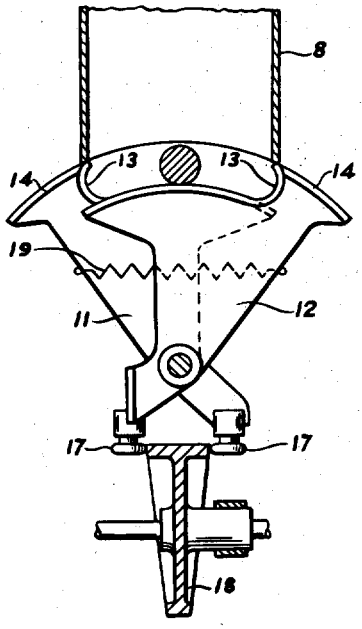
Figure 4:
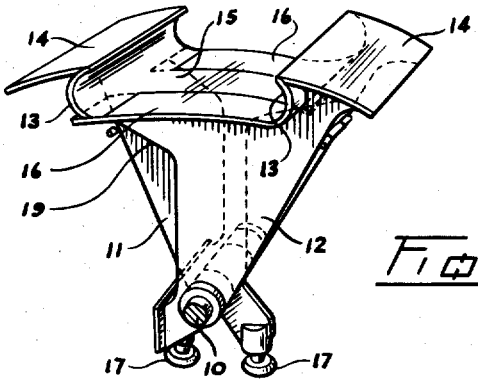
Fig. 4 is a perspective view of the dogs of the pre-compressing device.

Below hopper 8 is disposed the pre-compressing device which comprises two dogs as shown in Figs. 2 to 4. These dogs are mounted on two arm levers 11 and 12 which are rotatable on a shaft 10.

Each of the two levers 11, 12 carries on its upper end a gutter-like member 13 to the upper edge of which is secured a curved plate 14, and the radius of curvature of the latter corresponds to the distance between said edge and shaft 10. Plate 14 extends rearwardly and is so dimensioned that, when the dogs are closed (Fig. 2), the hopper outlet is closed by the two plates 14 which form supporting faces for the material in the hopper.

The lower edge of the member 13 carried by lever 11 carries in its central portion a curved tongue 15 of which the radius of curvature corresponds to the distance between said lower edge and shaft 10 (Figs. 2 and 4).

The other dog comprises two levers 12, i.e. at both of its ends the member 13 is carried by one such lever, and its lower edge on both of its ends carries two curved tongues 16 of which the curvature corresponds to that of tongue 15.

The width and length of said tongues 16 are such that the latter together with tongue 15, form a continuous supporting face in the open position of the dogs (Fig. 3) which face closes the hopper outlet.

The lower end of lever 11, as well as the connected lower ends of the levers 12, carry opposite rollers 17 between which is disposed a cam 18. The two levers 11, 12 are subjected to the action of springs 19 which bring about the closing movement of the dogs. The opening movement of the dogs is brought about by cam 18 against the action of the springs 19.

Cam 18 is rotated by the eccentric shaft 2 by means of a chain 20.

The mode of operation of the press is as follows: When eccentric shaft 2 is driven by motor M, ram 7 reciprocates relative to the outlet of hopper 8, and at the same time the dogs of the precompressing device are actuated. The drive mechanism is so controlled that the dogs are opened during the return stroke of ram 7 (Fig. 3), and the material drops on to the supporting faces 15, 16 whereupon the dogs are closed (Fig. 2). The material trapped therein is compressed to a loose blank of which the cross-section substantially corresponds to that of ram 7. The ram then is pushed forwardly and forces the material which has been precompressed in the dogs, into die head K.

The movements of the dogs and of the ram thus are synchronously controlled in the example shown and described. If such is not the case, no maximum efficiency is attained.

By reason of the fact that the closing movement of the dogs is not mechanically controlled, but by resilient means such as springs, the dogs will not be positively closed when the character or structure of the feed material suddenly changes for any reason, as otherwise the material may be too much compressed and the press overloaded.

When, for example, a highly increased percentage of fine corn is fed into the press, which material is less precompressible than the normal material which takes up more space, the dogs are closed to a lesser extent and the ram engages substantially the same mount of pressing material which then in the die head behaves similarly as the normal material mixture.

The springs 19 are chosen and exchanged in accordance with the kind and type of the material to be used. However, means may be provided for stressing the springs more or less, i.e. in order to make adjustable their elastic effect on the dogs.

The press duct in the die head may be made slightly conical from its inlet to its outlet, at least partly, according to the material to be used.

What I claim is:

[1. In an extrusion press having an extrusion die, a feed hopper at one end of the die and a ram for pushing material from the base of the hopper into said die, a pair of gutter-like members mounted in the base of the hopper in parallel relation to the path of the ram, means for moving one of said members towards the other of said members, means for moving the movable member away from the second of said members, said members being adapted to pre-compress material between them to a form conforming substantially to that of the ram and in substantial alignment with the die whereby the movement of the ram will push some of the precompressed material into the die, the upper edge of the gutter-like members each having a material supporting face, said faces being adapted when the members are closed to shut off the flow of material from the hopper, and means for supporting material flowing from the hopper when the gutter-like members are open.]

2. In an extrusion press having an extrusion die, a feed hopper at one end of the die and a ram for pushing material from the base of the hopper into said die, a pair of gutter-like members mounted in the base of the hopper in parallel relation to the path of the ram *each of said members having upper and lower longitudinally extending edges,* means for moving one of said members towards the other of said members, means for moving the movable member away from the second of said members, said members being adapted to pre-compress material between them to a form conforming substantially to that of the ram and in substantial alignment with the die whereby the movement of the ram will push some of the precompressed material into the die, the lower edge of the gutter-like members each having a material supporting face, said faces being adapted when the members are open to support material flowing from the hopper, and means for preventing material from flowing from the hopper when the gutter-like members are closed.

3. In an extrusion press having an extrusion die, a feed hopper at one end of the die and a ram for pushing material flowing from the hopper into the die, a pair of levers pivotally mounted below the hopper, a gutter-like member supported at the upper ends of each of the levers *each of said members having upper and lower longitudinally extending edges,* resilient means for rocking the levers to move the members toward each other to closed position, positive drive means for rocking the levers to move the members away from each other to open position, the upper edges of the members having material supporting faces adapted when the members are closed to shut off the flow of material from the hopper, the lower edges of the members having material supporting faces adapted when the members are open to support material flowing from the hopper, said opening and said closing means being synchronized with the movements of the ram whereby material dropping from the hopper is pre-compressed into a loose blank before being pushed by the ram into the die head.

4. An extrusion press as claimed in claim 3 wherein the upper and lower material supporting faces each have a radius of curvature substantially centered upon the lever pivot.

*5. An extrusion press comprising an extrusion die, a hopper adapted to receive compressible material disposed at one end of the die and having a downwardly facing opening at the bottom portion thereof, a ram for pushing material flowing through said opening into said die, precompressing means for substantially reducing the volume of material flowing from the hopper and comprising a pair of gutter-like members having upper and lower portions and material engaging faces below said hopper, at least one of said members being movable toward and away from the other of said members, said members being movable under the opening in the hopper and movable into ultimate compressing position beneath said opening, means for moving said one member with respect to the other member, said ram being movable transversely of said opening and substantially parallel to and between said material engaging faces, means at the lower portion of said gutter-like members for supporting the material of the hopper when the gutter-like members are open, and means for supporting the material of the hopper when said gutter-like members are closed.*

*6. An extrusion press as defined in claim 5, wherein said means for moving said one member with respect to the other member includes a spring means for moving said one member toward the other member and a cam means for moving said one member away from the other member.*

*7. An extrusion press as defined in claim 5, wherein the distance between said gutter-like members when in spaced-apart relationship is substantially equal to the width of the discharge opening of the hopper.*

*8. An extrusion press as defined in claim 5, wherein at least one of said gutter-like members is pivotally mounted about an axis substantially parallel to that of the ram and is adapted to swing in an arc toward and away from the other of said members.*

*9. An extrusion press as defined in claim 5, wherein means is provided for synchronously controlling the opening and closing of the gutter-like members in relation to the movement of the ram.*

*10. An extrusion press as defined in claim 5, wherein each of the gutter-like members is mounted for swinging movement toward and away from each other.*

*11. An extrusion press comprising an extrusion die, a hopper adapted to receive compressible material disposed at one end of the die and having a downwardly facing opening at the bottom portion thereof, a ram for pushing material flowing through said opening into said die, precompressing means for substantially reducing the volume of material flowing from the hopper and comprising a pair of gutter-like members having upper and lower portions and material engaging faces below said hopper, at least one of said members being movable toward and away from the other of said members, said members being movable under the opening in the hopper and movable into ultimate compressing position beneath said opening, means for moving said one member with respect to the other member, said ram being movable transversely of said opening and substantially parallel to and between said material engaging faces, means attached to the lower portion of at least one of said gutter-like members for supporting the material of the hopper when the gutter-like members are open, and means for supporting the material of the hopper when said gutter-like members are closed.*

References Cited in the file of this patent or the original patent

| | | |
|---|---|---|
| 1,770,396 | Fuller et al. | July 15, 1930 |
| 1,890,802 | Apple | Dec. 13, 1932 |